UNITED STATES PATENT OFFICE.

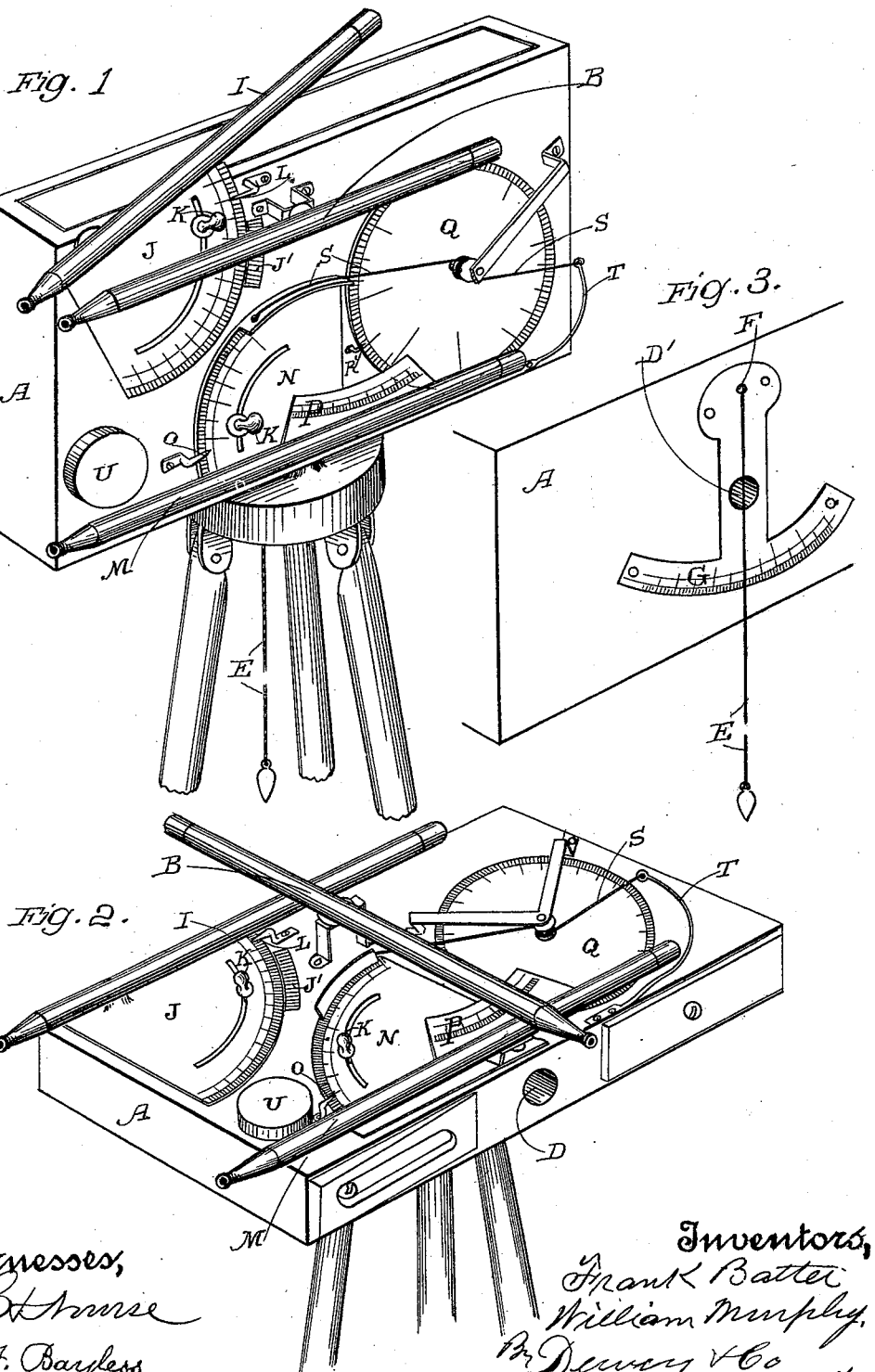

FRANK BATTER AND WILLIAM MURPHY, OF MARSHFIELD, OREGON.

SURVEYING-INSTRUMENT.

SPECIFICATION forming part of Letters Patent No. 539,605, dated May 21, 1895.

Application filed May 8, 1894. Serial No. 510,504. (No model.)

*To all whom it may concern:*

Be it known that we, FRANK BATTER and WILLIAM MURPHY, citizens of the United States, residing at Marshfield, Coos county, State of Oregon, have invented an Improvement in Surveying-Instruments; and we hereby declare the following to be a full, clear, and exact description of the same.

Our invention relates to an imstrument which is especially designed to assist in instructing learners in the use of transit, theodolite, and instruments of that class.

It consists in certain details of construction which will be more fully explained by reference to the accompanying drawings, in which—

Figure 1 is a perspective view of our invention in position for taking altitudes or leveling. Fig. 2 shows it in position for taking long distances. Fig. 3 shows the side of the instrument to which the plumb-line is attached.

The object of this invention is to provide an instrument which while not of exceeding accuracy or fineness of construction, is suitable to be placed in the hands of boys and learners for the purpose of assisting them in learning the rudiments of this class of mathematical work, and the use of instruments connected therewith.

The instrument may also be used where great exactness is not required, for laying out wagon road grades in mountainous country, and for the survey of short water ditches, leveling, &c.

A is a base or support for the different parts of the instrument, which is preferably made in the form of a hollow box with a sliding door or cover to allow of the necessary papers being carried therein. This box is made of any suitable or convenient form as ten by six by two inches, and serves as a support for the observation tubes, of which we have in the present case shown three.

The box or base A has a socket at D made about the center of one edge, adapted to receive the head of a tripod C, by which the apparatus is supported when it is to be used for the purpose of leveling or taking altitudes. In the center of one side is another socket D' which is fitted upon the head of the tripod so that the instrument is in a horizontal position when it is to be used for ascertaining distances. Upon one side of the box are pivoted the observation tubes B, I and M, each having an eye piece at one end and cross wires (not shown) at the opposite end as is customary in this class of devices. The tube I is pivoted at or near one end to the upper left corner of the box. The tube M is centrally pivoted at the lower edge of the box, and the tube B is centrally pivoted to the box just below the tube I and sufficiently out of its plane of movement to allow the tube B to be turned across it at a right angle or other angle. A plumb line E having a weight at its lower end is attached at F on the side of the box opposite to the tubes and by means of a graduated scale G the box is leveled when set upon edge. The plumb line is not used when the box is used upon its side in a horizontal position.

Connected and movable with the tube I is a quadrant J, the curvature of which is formed about the pivot or center of movement of the tube I. This quadrant is locked at any desired point by means of a binding screw K passing through a curved slot in the plate, and its periphery is graduated into degrees, minutes and seconds so as to show the angle to which the tube is set by means of an indicator or pointer L fixed to the side of the box and projecting over the graduations of the quadrant. In addition to this a vernier J' may be employed for the purpose of reading the subdivisions of the scale more accurately, this vernier operating in the manner usual for such devices.

The tube M which is pivoted to the lower edge of the box as it stands on edge, has also a graduated quadrant N fixed to turn with it, and having the same pivotal center, and the indicator or pointer O fixed to the side of the box projects over the graduations in the same manner as has been described for the indicator L.

P is a graduated scale fixed upon or near the center of the tube M in such a position relative to the pivotal point of the tube B as to indicate when the latter has been turned to stand at a right or other angle with the tubes M and I.

When it is desired to use the instrument for taking altitudes or leveling, it is set up on edge. Either of the tubes I or M may be used for leveling purposes, but the tube I alone is used for taking altitudes, because it has a wider range of movement than the tube M.

If now it be desired to ascertain the height of a tree or mountain, the box being first leveled upon the tripod, or support by means of the plumb line E, the tube I is turned until it points to the top of the object, and the distance from the instrument to the base of the object being known, the necessary two angles and included side will have been obtained from which the problem may easily be worked in the usual manner. The work of leveling is also done with the instrument in this position and needs no further explanation.

When it is desired to ascertain distances, the instrument is placed upon its side so that the observation tubes are upon the top. If the distance is very short, it will only be necessary to use the tubes I and M as the width of the box will give a base line sufficient for calculation by taking the angles with the two tubes, but if the distance be great, the instrument is first set, the object is sighted through the tube I, then the tube B is turned at right angles with I, or at right angles with the position of the instrument which is ascertained by reading the graduated scale of the tube I, and by means of the arc P, the tube B is adjusted to the desired position. One or more stakes are then driven in line with the tube B a sufficient distance from the apparatus to provide a base line of the necessary length. The apparatus is then moved and reset at this point, and a second observation is taken through the tube B which is turned and sighted back to the first station, to set the instrument in the position parallel with its original position. This being done, the tube M is then turned to stand in line with the object, and the degrees are read upon the graduated scale of this tube. The two angles and included side are thus obtained and the problem worked out, and distance ascertained as in the usual manner.

If any other angle than a right angle with the original position is taken, it will be shown by the graduated arc P over which the tube B moves, and the problem will be worked out in accordance.

Q is a circular graduated dial pivoted to turn upon the side of the box, and R is a fixed indicator which extends over its graduated rim. This dial has a drum or shaft and around it a cord S makes one or two turns, one end being attached to the end of the quadrant N, while the other upon the opposite side is connected with a spring T which keeps the cord at the proper tension and causes it to rotate the dial Q in unison with the movement of the observation tube M and its quadrant. The object of this is to enlarge the subdivisions of degrees and minutes which would be too fine for easy inspection upon the limited arc of N, but which will be very much enlarged by reason of the distance around the circumference of the dial. As the dial moves in unison with the movement of the arc N, it will be seen that it serves to accurately indicate the smaller subdivisions over which the tube is moved.

At U we have shown a recess fitted to the box which is adapted to hold a small compass for such uses as may be needed.

Having thus described our invention, what we claim as new, and desire to secure by Letters Patent, is—

1. An apparatus consisting of narrow hollow box having a door controlled entrance, a tripod by which it is supported, observation tubes pivotally secured upon one side of the box near its opposite edges and having suitable quadrants connected and movable with them, and another pivotally mounted tube interposed between the first named tubes.

2. An apparatus consisting of a box, a tripod for supporting the same, observation tubes near opposite edges of the box each connected and movable with a quadrant, and an observation tube pivotally secured to the box between the first named tubes and lying outside of the plane of the movement of said first named tubes so that it may be turned at an angle across said tubes, and a graduated scale contiguous to the center of movement of one of the first named tubes to indicate the position of the intermediate tube with relation to the other tubes.

3. An apparatus consisting of a detachable inter-changeable box having means whereby it may be set on edge or flat-wise, a tripod for supporting the same, a fixed graduated scale and plumb-line at one side of the box, an observation tube pivotally secured upon the opposite side of said box, a quadrant connected to and movable with the tube, a fixed pointer and a means for locking the quadrant in position.

4. An apparatus for instruction in the use of surveying and similar instruments, consisting of a box having sockets in its side and edge whereby it may be detachably supported in different positions for different classes of work, a tripod upon which it is supported, observation tubes pivoted upon the surface and movable about their pivot points, graduated quadrants attached to and turnable with the tubes, with locking thumb screws to hold them in any desired position, and a circular revoluble dial pivoted to the side of the plate and having a cord passing around its shaft connected at one end with one of the quadrants, and at the other with the tension spring whereby the movement of the observation tube and its quadrant will rotate the loose dial in either direction.

5. An apparatus for surveying and leveling, consisting of a box or frame, observation tubes pivoted upon one side of the box and turnable with relation to each other, with graduated scales whereby the angles of inclination are indicated, sockets formed in one edge and in the side opposite to that upon which the tubes are pivoted, and a support upon which the box is mounted in either position for different classes of work.

In witness whereof we have hereunto set our hands.

FRANK BATTER.
WILLIAM MURPHY.

Witnesses:
W. H. S. HYDE,
JOHN F. HALL.